(No Model.)

J. A. LONG & E. L. BABCOCK.
WHEEL FOR AGRICULTURAL IMPLEMENTS.

No. 331,248. Patented Nov. 24, 1885.

Witnesses.

Inventors.
Jeremiah A. Long.
Erskine L. Babcock.
By C. H. Humphrey
Atty.

UNITED STATES PATENT OFFICE.

JEREMIAH A. LONG, OF AKRON, AND ERSKINE L. BABCOCK, OF CUYAHOGA FALLS, OHIO.

WHEEL FOR AGRICULTURAL IMPLEMENTS.

SPECIFICATION forming part of Letters Patent No. 331,248, dated November 24, 1885.

Application filed May 21, 1883. Serial No. 95,706. (No model.)

*To all whom it may concern:*

Be it known that we, JEREMIAH A. LONG, of Akron, and ERSKINE L. BABCOCK, of Cuyahoga Falls, both in the county of Summit and State of Ohio, and both citizens of the United States, have invented a new and useful Improvement in Driving-Wheels for Agricultural Implements, of which the following is a specification.

Our invention relates to that class of wheels which are employed to communicate motion to the mechanism of agricultural implements, reapers, harvesting-machines, &c. It is desirable that such wheels combine torsional resistance, by which is meant the ability to communicate to the hub the power applied to the periphery, with strength to resist strains other than torsion and lightness. It is also desirable that these wheels be so constructed as to avoid becoming entangled with grass, straw, sticks, &c., and becoming loaded with or carrying earth on the inner periphery.

The object of our invention is to construct a wheel which shall embody all the above elements and requisites.

It consists in a broad periphery or tire and a corresponding hub, both of metal or other suitable material, between and connecting which, in lieu of spokes, shall be on each side a disk of sheet metal corrugated with a succession of waves, grooves, channels, or notches concentric with the disk, which said disks shall be placed parallel to each other and substantially in the planes of the edges of the tire, or farther apart at the hub than at the tire.

In the accompanying drawings is shown one form of a wheel embodying our invention, in which—

Figure 1:
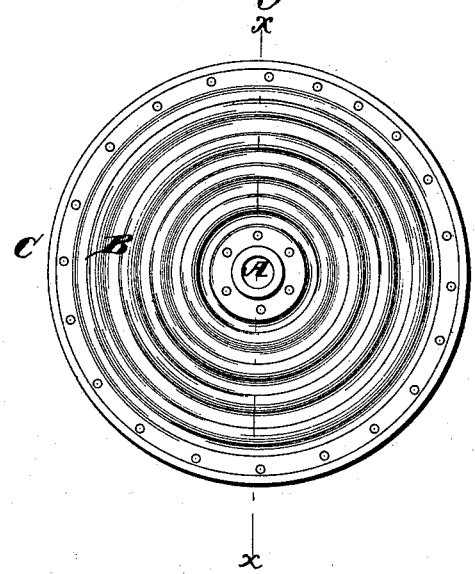
Figure 2:
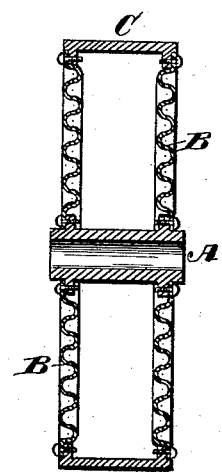

Figure 1 is a side elevation, and Fig. 2 a cross-section at the line *x x*.

The hub A is a hollow metallic cylinder, bored to fit on the driving-shaft and adapted at each end to be connected to the corrugated plates B. The plates B are corrugated in a series of concentric waves, and are securely attached to the hub A and rim C by bolts, screws, or rivets.

The rim or periphery C consists of a hoop of metal or other material of such lateral configuration as experience may determine to be most advantageous, and its face may be smooth, crowning, concave, or corrugated or provided with slats, as desired.

We claim—

A wheel for agricultural implements, consisting of a rim and a hub united in the plane of their lateral faces by two concentrically-corrugated sheet-metal disks free from contact with each other between the hub and rim, the disks being connected to the tire substantially in the planes of the edges of the tire, as and for the purposes described.

In testimony that we claim the foregoing we have hereunto set our hands this 12th day of May, A. D. 1883.

JEREMIAH A. LONG.
ERSKINE L. BABCOCK.

Witnesses:
C. P. HUMPHREY,
E. W. STUART.